US012149837B2

United States Patent
Chen et al.

(10) Patent No.: US 12,149,837 B2
(45) Date of Patent: Nov. 19, 2024

(54) AUTO WHITE BALANCE ADJUSTING METHOD AND AUTO WHITE BALANCE ADJUSTING SYSTEM BY USING DYNAMIC WINDOW ALLOCATIONS

(71) Applicant: WELTREND SEMICONDUCTOR INC., Hsinchu (TW)

(72) Inventors: Chien-Ming Chen, Hsinchu (TW); Chun-Ying Li, Hsinchu (TW); Hsuan-Ying Chen, Hsinchu (TW); Te-Wei Hsu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 93 days.

(21) Appl. No.: 18/142,593

(22) Filed: May 3, 2023

(65) Prior Publication Data

US 2024/0244335 A1    Jul. 18, 2024

(30) Foreign Application Priority Data

Jan. 16, 2023    (TW) .................................. 112101669

(51) Int. Cl.
*H04N 23/88*    (2023.01)
*G06T 7/90*    (2017.01)
*H04N 9/73*    (2023.01)

(52) U.S. Cl.
CPC ............... *H04N 23/88* (2023.01); *G06T 7/90* (2017.01); *H04N 9/73* (2013.01)

(58) Field of Classification Search
None
See application file for complete search history.

(56) References Cited

U.S. PATENT DOCUMENTS

| | | | | |
|---|---|---|---|---|
| 2010/0259639 | A1* | 10/2010 | Hung | H04N 23/88 382/167 |
| 2014/0168463 | A1* | 6/2014 | Tamura | H04N 23/88 348/223.1 |
| 2016/0155217 | A1* | 6/2016 | Moriya | H04N 23/88 382/167 |
| 2017/0195648 | A1* | 7/2017 | Zhang | H04N 1/6077 |
| 2019/0335150 | A1* | 10/2019 | Shin | G06T 7/90 |

FOREIGN PATENT DOCUMENTS

| | | | |
|---|---|---|---|
| TW | 202145777 A | 12/2021 | |
| TW | 202241124 A | 10/2022 | |
| WO | WO-2019137396 A1 * | 7/2019 | ............... G06T 5/00 |

\* cited by examiner

*Primary Examiner* — Paul M Berardesca
(74) *Attorney, Agent, or Firm* — Winston Hsu

(57) ABSTRACT

An auto white balance adjusting method includes acquiring an image, allocating N windows inside the image according to color information of the image, filtering out M windows from the N windows for generating N-M windows according to feature information of the N windows, grouping the color temperatures of the N-M windows for generating at least one color temperature group according to a standard color temperature curve, setting a first weighting of the at least one color temperature group according to a correlation between the at least one color temperature group and the standard color temperature curve, setting a second weighting of the at least one color temperature group according to spatial information of the at least one color temperature group of the image, and adjusting a white balance of the image according to color information, the first weighting, and the second weighting.

20 Claims, 5 Drawing Sheets

AUTO WHITE BALANCE ADJUSTING METHOD AND AUTO WHITE BALANCE ADJUSTING SYSTEM BY USING DYNAMIC WINDOW ALLOCATIONS

BACKGROUND OF THE INVENTION

1. Field of the Invention

The present invention relates to an auto white balance adjusting method and an auto white balance adjusting system, and more particularly, an auto white balance adjusting method and an auto white balance adjusting system by using dynamic window allocations.

2. Description of the Prior Art

With rapid development of technology, various light sensors and image processing methods are applied in our daily life. Light sensors and image processing methods are used for restoring true colors of images under current environmental light. Different environments cause different light sources. Since different light sources have different color temperatures, when an object is illuminated by different light sources, the object may present different colors. The color temperature can be quantized as a "K" value. When the "K" value is decreased, the color of the object becomes reddish in hue. When the "K" value is increased, the color of the object becomes bluish in hue. Therefore, when various light sources are illuminated to the object, the color shift of the object occurs, leading to a severe white balance offset.

In image processing technologies, a purpose of adjusting the white balance is to calibrate the color shift. When the color shift of the image is calibrated, the image can approach its true colors. In general, the color shift of the image is obvious when the color shift of a "white" object occurs. Therefore, the "white color" is usually used as a reference color for eliminating the color shift. However, different cameras have different photosensitive elements and different white balance adjustment processes. Since the red (R), green (G), and blue (B) colors detected by the photosensitive element of the camera are unbalanced under different color temperatures, color distortion is prone to occur. For example, the color temperature of the image is obviously reddish or bluish under specific light sources. Therefore, adjusting the white balance of the image is an important issue for the image processing technology.

Currently, two white balance adjusting methods are commonly used, denoted as gray world algorithm and perfect reflector algorithm. In the gray world algorithm, a drawback is that when the color in the image is relatively monotonous, the white balance adjustment performance may be greatly decreased. In the perfect reflection algorithm, when the brightest area in the image is not absolutely white, the white balance adjustment performance may be greatly decreased.

Therefore, to develop a white balance adjusting method capable of filtering out chaotic light or extreme light for increasing an accuracy of white balance adjustment is an important issue.

SUMMARY OF THE INVENTION

In an embodiment of the present invention, an auto white balance adjusting method is disclosed. The auto white balance adjusting method comprises acquiring an image, allocating N windows inside the image according to color information of the image, acquiring feature information of each of the N windows, filtering out M windows from the N windows for generating N-M windows according to the feature information of the N windows, grouping color temperatures of the N-M windows for generating at least one color temperature group according to a standard color temperature curve, setting a first weighting of the at least one color temperature group according to a correlation between the at least one color temperature group and the standard color temperature curve, setting a second weighting of the at least one color temperature group according to spatial information of the at least one color temperature group of the image, and adjusting a white balance of the image according to color information of the N-M windows, the first weighting of the at least one color temperature group, and the second weighting of the at least one color temperature group. N and M are two positive integers. N is greater than M.

In another embodiment of the present invention, an auto white balance adjusting system is disclosed. The auto white balance adjusting system comprises an image capturing device, a memory, an output device, and a processor. The image capturing device is configured to acquire an image. The memory is configured to save data. The output device is configured to output an adjusted image. The processor is coupled to the image, the memory, and the output device and configured to control the image, the memory, and the output device. After the image capturing device acquires an image, the processor allocates N windows inside the image according to color information of the image. The processor acquires feature information of each of the N windows. The processor filters out M windows from the N windows for generating N-M windows according to the feature information of the N windows. The processor groups color temperatures of the N-M windows for generating at least one color temperature group according to a standard color temperature curve saved in the memory. The processor sets a first weighting of the at least one color temperature group according to a correlation between the at least one color temperature group and the standard color temperature curve. The processor sets a second weighting of the at least one color temperature group according to spatial information of the at least one color temperature group of the image. The processor adjusts a white balance of the image according to color information of the N-M windows, the first weighting of the at least one color temperature group, and the second weighting of the at least one color temperature group. The processor controls the output device for outputting the adjusted image. N and M are two positive integers. N is greater than M.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
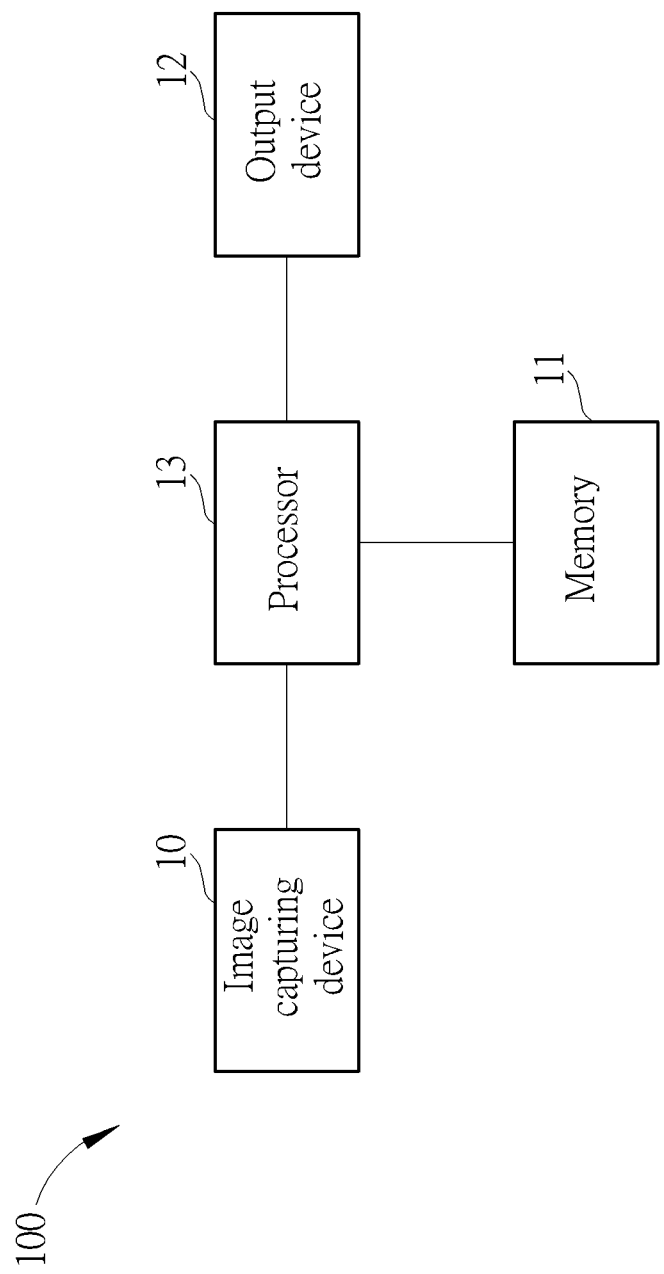
FIG. 1 is a block diagram of an auto white balance adjusting system according to an embodiment of the present invention.

FIG. 1 is a block diagram of an auto white balance adjusting system 100 according to an embodiment of the present invention. The auto white balance adjusting system 100 can be used for continuously adjusting color shifted images due to interferences of external light sources. The auto white balance adjusting system 100 includes an image capturing device 10, a memory 11, an output device 12, and a processor 13. The image capturing device 10 is used for acquiring an image. The image capturing device 10 can be a camera or any device having a photosensitive element. The memory 11 is used for saving data. The output device 12 is used for outputting an adjusted image. The output device 12 can be a screen, a connection port for outputting images, or a projection system. The processor 13 is coupled to the image capturing device 10, the memory 11, and the output device 12 for controlling the image capturing device 10, the memory 11, and the output device 12. Particularly, the auto white balance adjusting system 100 can filter out chaotic light or extreme light for increasing an accuracy of white balance adjustment. Further, the auto white balance adjusting system 100 can use spatial information for further optimizing the white balance of the image. In the auto white balance adjusting system 100, after the image capturing device 10 acquires an image, the processor 13 can allocate N windows inside the image according to color information of the image. Here, a part of N windows are overlapped with one another. Sizes of the N windows are not exactly the same. Details are illustrated later. Then, the processor 13 acquires feature information of each of the N windows. For example, the processor 13 acquires a variance, a standard deviation, a horizontal gradient, and/or a vertical gradient of a plurality of pixels of each of the N windows. Then, the processor 13 filters out M windows from the N windows for generating N-M windows according to the feature information of the N windows. The processor 13 can group color temperatures of the N-M windows for generating at least one color temperature group according to a standard color temperature curve saved in the memory 11. Then, the processor 13 sets a first weighting of the at least one color temperature group according to a correlation between the at least one color temperature group and the standard color temperature curve. The processor 13 sets a second weighting of the at least one color temperature group according to spatial information of the at least one color temperature group of the image. The processor 13 can adjust the white balance of the image according to color information of the N-M windows, the first weighting of the at least one color temperature group, and the second weighting of the at least one color temperature group. Then, the processor 13 can control the output device 12 for outputting the adjusted image. N and M are two positive integers. N is greater than M. Details of adjusting the white balance of the image performed by the auto white balance adjusting system 100 are illustrated later.

Figure 2:
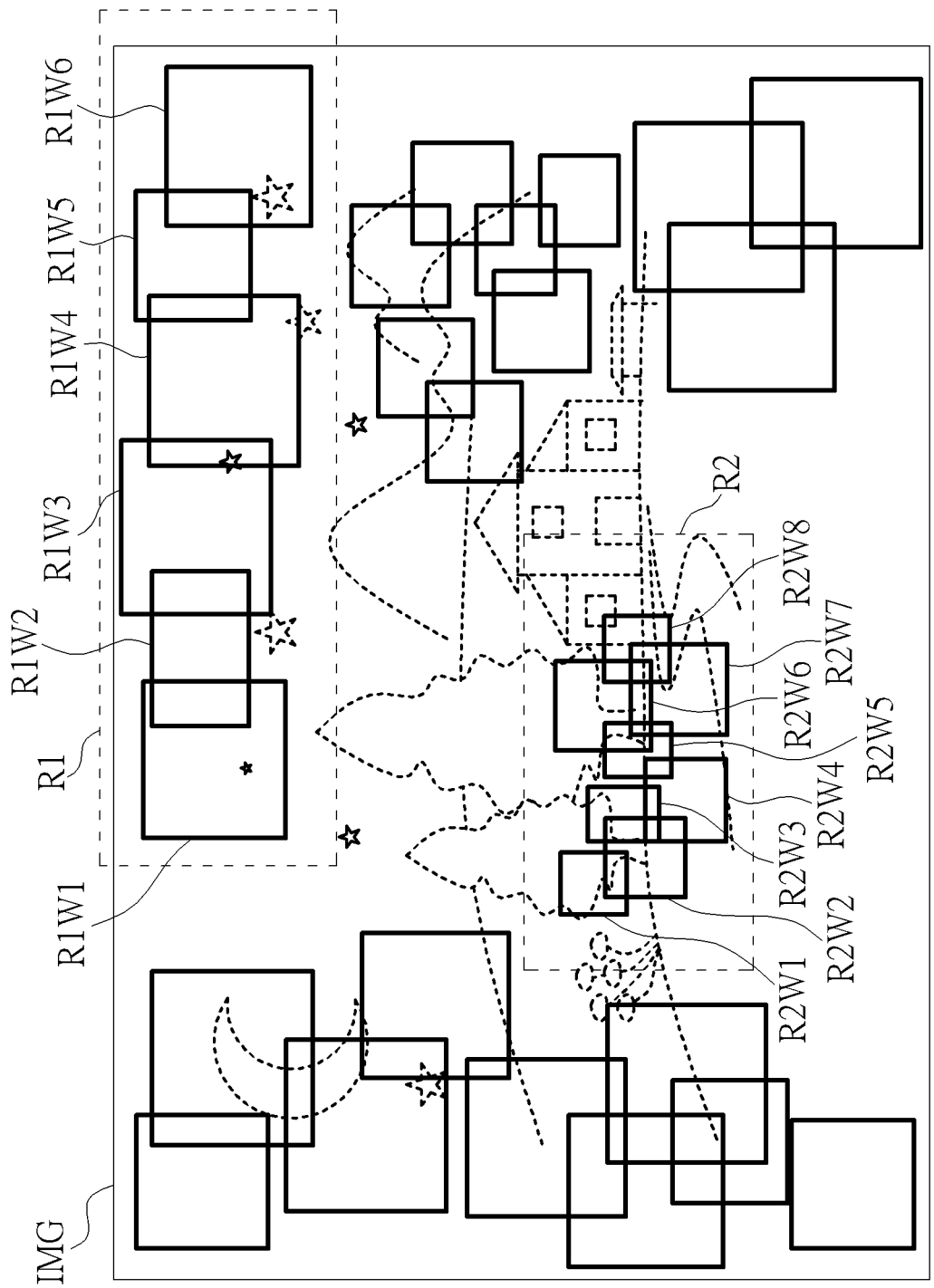
FIG. 2 is an illustration of allocating N windows inside an image according to color information of the image of the auto white balance adjusting system in FIG. 1.

FIG. 2 is an illustration of allocating N windows inside an image IMG according to color information of the image of the auto white balance adjusting system 100. For simplicity, in FIG. 2, only a first region R1 and a second region R2 are introduced. As previously mentioned, the color information can include the variance, the standard deviation, the horizontal gradient, and/or the vertical gradient of the image. For the image IMG in FIG. 2, the first region R1 can include a sky region. The processor 13 can detect a first color distribution of the first region R1 of the image IMG according to the color information of the image IMG. For example, since the first region R1 can include the sky region, the first region R1 corresponds to monotonous color, such as blue color (i.e., a sunny day). Further, the processor 13 can detect a second color distribution of the second region R2 of the image IMG according to the color information of the image IMG. For example, since the second region R2 can include a tree region, a grassland region, and a house region, the second region R2 corresponds to complex color. Further, the processor 13 can calculate the image color complexity of the first region R1 and the second region R2. The image color complexity can be quantized by the variance, the standard deviation, the horizontal gradient, and/or the vertical gradient distribution. Then, the processor 13 can allocate an appropriate number of windows having dynamic sizes according to the image complexity of different regions. For example, the processor 13 can increase the number of windows allocated in the first region R1 when a variance of the first color distribution is greater than a variance of the second color distribution. In FIG. 2, the processor 13 can allocate first windows R1W1 to R1W6 having larger sizes in the first region R1. Since the first region R1 corresponds to the monotonous color, the first windows R1W1 to R1W6 having larger sizes can be used for sampling the color information of the first region R1. Further, the processor 13 can allocate second windows R2W1 to R2W8 having smaller sizes in the second region R2. Since the second region R2 corresponds to the complex color, the second windows R2W1 to R2W8 having smaller sizes can be used for sampling the color information of the second region R2. Further, as previously mentioned, in the first windows R1W1 to R1W6, apart of windows can be overlapped with one another. Sizes of the first windows R1W1 to R1W6 are not exactly the same. Similarly, in the second windows R2W1 to R2W8, a part of windows can be overlapped with one another. Sizes of the second windows R2W1 to R2W8 are not exactly the same. The window allocation method for other regions of the image IMG is similar to aforementioned embodiments. Therefore, details are omitted here. In other words, the processor 13 can dynamically allocate windows having different sizes for sampling the color information (i.e., say "blocked based") of the image IMG. Since the auto white balance adjusting system 100 introduces a plurality of windows for sampling the color information of the image IMG, the computational complexity can be reduced.

After the processor 13 allocates N windows of the image IMG according to the color information of the image IMG, the processor 13 can remove extreme or chaotic color regions in the image IMG, as illustrated below. In the auto white balance adjusting system 100, the processor 13 can set a threshold. Then, the processor 13 can detect a color shift characteristic of each of the N windows. The processor 13 can filter out M windows from the N windows when color shift characteristics of the M windows are greater than or equal to the threshold. For example, the processor 13 can detect a color variance of a plurality of pixels of each of N windows. If the color variances of M windows are greater than or equal to the threshold, it implies that colors of the M windows are complex and chaotic. Therefore, the M windows are dropped by the processor 13. In other words, after the M windows from the N windows are filtered out, color shift characteristics of remaining N-M windows are smaller than the threshold. The colors of the remaining N-M windows are relatively monotonous. Therefore, the remaining N-M windows can be used for adjusting the white balance of the image IMG. By doing so, the white balance adjusting system 100 can remove extreme or chaotic color regions in the image IMG. As a result, an accuracy of adjusting the white balance of the image IMG will not be affected by complex or chaotic light colors.

Figure 3:
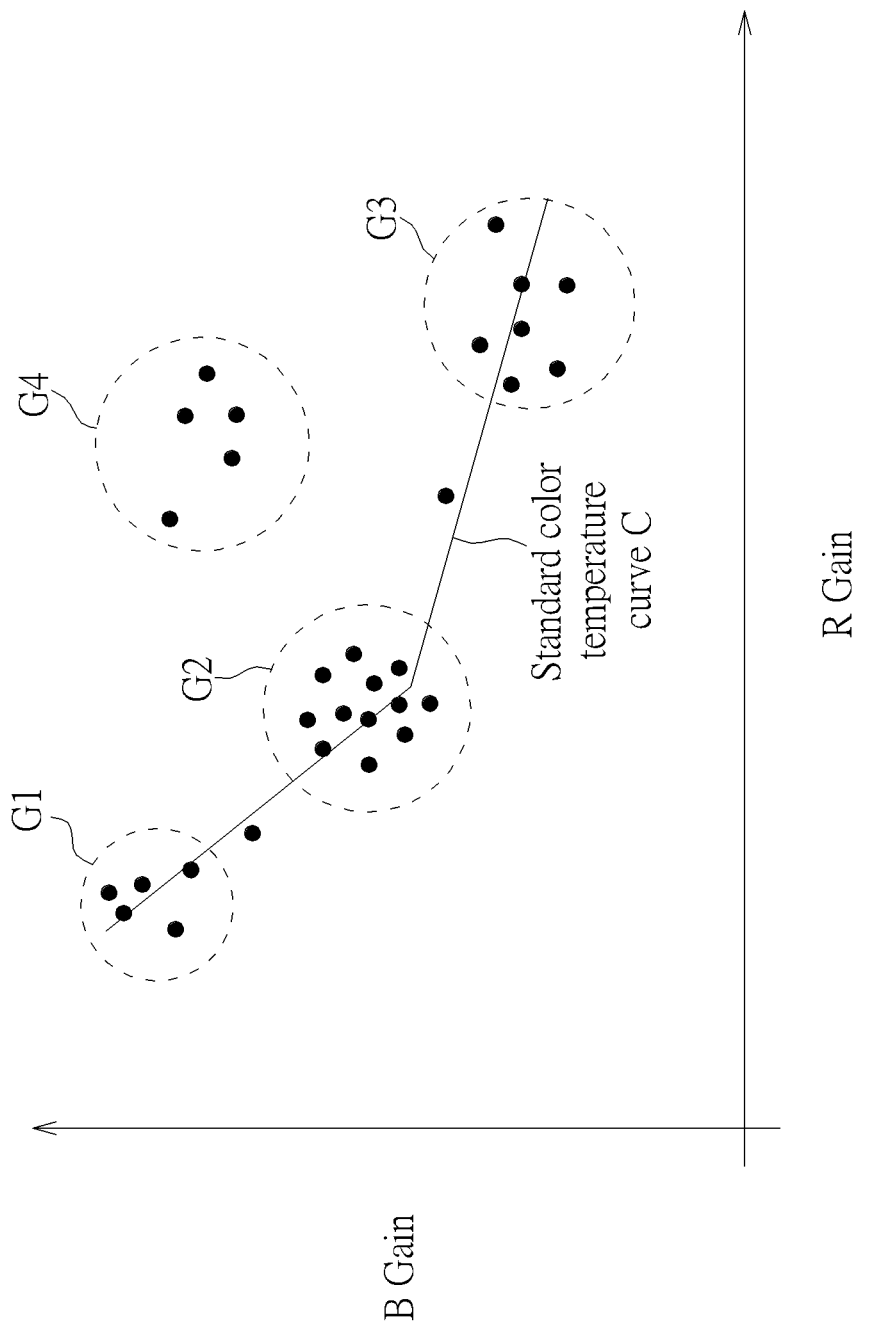
FIG. 3 is an illustration of grouping the color temperatures of remaining N-M windows for generating at least one color temperature group according to a standard color temperature curve of the auto white balance adjusting system in FIG. 1.

FIG. 3 is an illustration of grouping the color temperatures of remaining N-M windows for generating at least one color temperature group according to a standard color temperature curve C of the auto white balance adjusting system 100. As previously mentioned, the processor 13 can filter out M windows from the N windows for generating N-M windows according to the feature information of the N windows. Then, the processor 13 can acquire the standard color temperature curve C from the memory 11. As illustrated in FIG. 3, the standard color temperature curve C is in the three primary color domain (RGB Domain). An X-axis is denoted as a red gain (i.e., a normalized red gain) axis. A Y-axis is denoted as a blue gain (i.e., a normalized blue gain) axis. Then, the processor 13 can acquire a distance between the color temperatures of the N-M windows and the standard color temperature curve C in the RGB domain. For example, the processor 13 can acquire coordinates of the color temperatures of the N-M windows located on the RGB domain. Then, the processor 13 can acquire Euclidean distances between the coordinates of the color temperatures of the N-M windows located on the RGB domain and the standard color temperature curve C. However, the auto white balance adjusting system 100 is not limited to using the Euclidean distances for indicating correlations between the color temperatures of the N-M windows and the standard color temperature curve C. Any reasonable technology modification falls into the scope of the present invention. Then, the processor 13 can group the color temperatures of the N-M windows into Q color temperature groups according to the distance between the color temperatures of the N-M windows and the standard color temperature curve C in the RGB domain. Q is a positive integer. For example, the processor 13 can group the color temperatures of the N-M windows into four color temperature groups (i.e., a first group G1, a second group G2, a third group G3, and a fourth group G4) according to the distance between the color temperatures of the N-M windows and the standard color temperature curve C in the RGB domain. Then, the processor 13 can set weightings of the first group G1, the second group G2, the third group G3, and the fourth group G4 under various modes. For example, in a first mode, the processor 13 can detect the number of color temperatures of each of the Q color temperature groups. The processor 13 can increase a first weighting of a color temperature group when the number of color temperatures of the color temperature group is increased. Further, the processor 13 can decrease the first weighting of the color temperature group when the number of color temperatures of the color temperature group is decreased. For example, for the first group G1, the second group G2, the third group G3, and the fourth group G4, the number of color temperatures of the windows in the first group G1 is greater than other groups. Therefore, a first weighting of the first group G1 is larger than other groups. In other words, the numbers of color temperatures of the windows in the second group G2, the third group G3 and the fourth group G4 are smaller than the first group G1. Therefore, the first weightings of the second group G2, the third group G3, and the fourth group G4 are smaller than the first group G1. The first weighting is a non-negative number. In a second mode, the processor 13 can detect an average distance between color temperatures of each of the Q color temperature groups and the standard color temperature curve C. The processor 13 can decrease the first weighting of a color temperature group when an average distance between color temperatures of the color temperature group and the standard color temperature curve C is increased. Further, the processor 13 can increase the first weighting of the color temperature group when the average distance between the color temperatures of the color temperature group and the standard color temperature curve C is decreased. For example, the fourth group G4 obviously deviates from the standard color temperature curve C (i.e., the average distance between the fourth group G4 and the standard color temperature curve C is very large). As a result, the first weighting of the fourth group G4 can be decreased by the processor 13. In an embodiment, when the first weighting of the fourth group G4 is decreased to zero, the fourth group G4 is dropped. Briefly, by using a mechanism of grouping the color temperature of the remaining N-M windows and setting weightings of the groups according to the standard color temperature curve C in FIG. 3, biased or extreme color regions can be removed. Further, weightings of color regions closed to the standard color temperature curve C can be increased. Therefore, the accuracy of adjusting the white balance by the auto white balance adjusting system 100 can be further improved.

Figure 4:
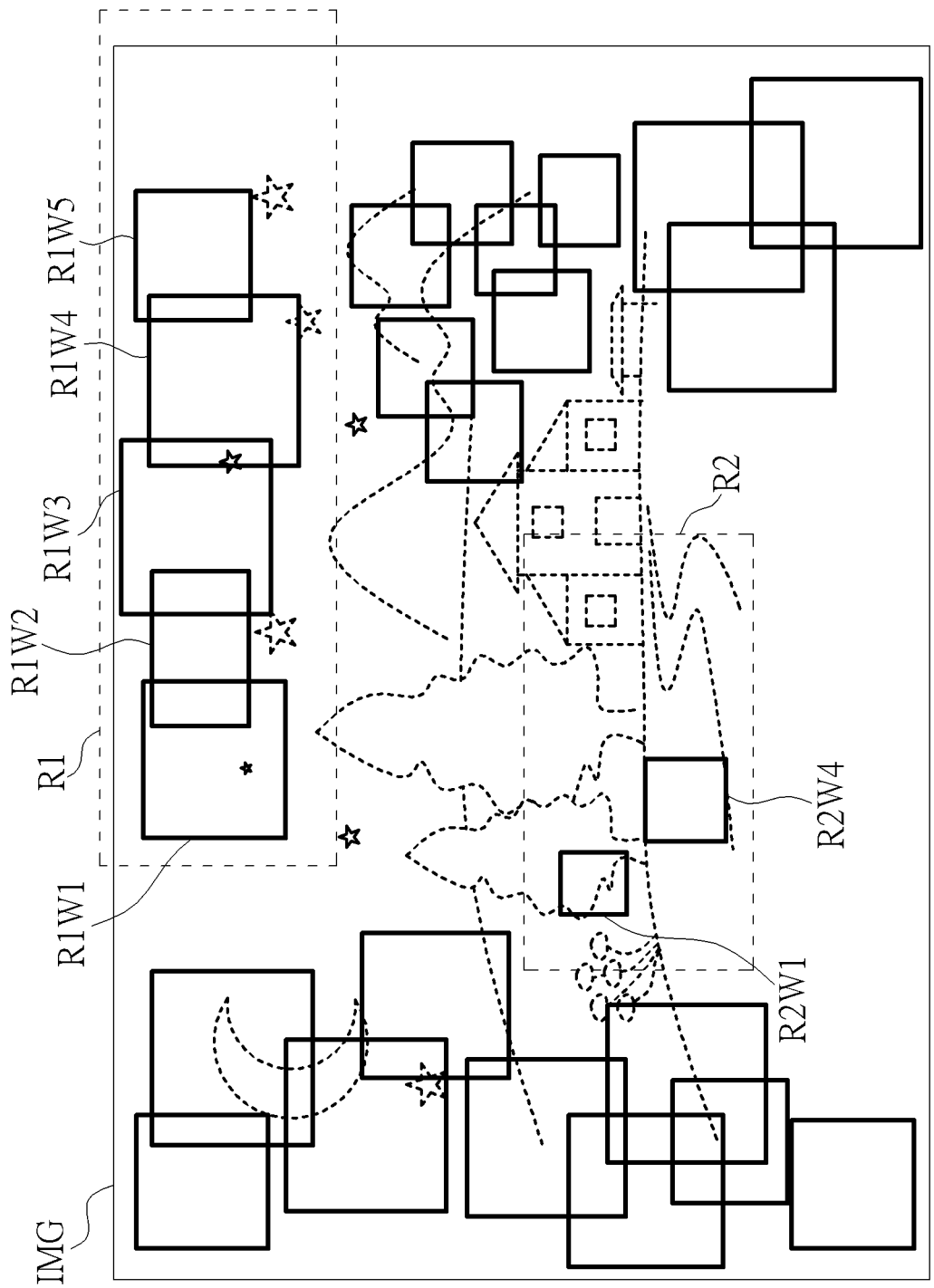
FIG. 4 is an illustration of setting a second weighting of at least one color temperature group according to spatial information of the at least one color temperature group of the image of the auto white balance adjusting system in FIG. 1.

FIG. 4 is an illustration of setting a second weighting of at least one color temperature group according to spatial information of the at least one color temperature group of the image IMG of the auto white balance adjusting system 100. As previously mentioned, the processor 13 can allocate N windows inside the image IMG according to color information of the image IMG. Then, the processor 13 can filter out M windows from the N windows for generating N-M windows according to the feature information of the N windows. For example, the first region R1 includes the remaining first windows R1W1, R1W2, R1W3, R1W4, and R1W5. The second region R2 includes the remaining second windows R2W1 and R2W4. Further, by using previously steps, the processor 13 can group the color temperatures of the N-M windows for generating Q color temperature groups according to the standard color temperature curve C. Then, the processor 13 can set first weightings of the Q color temperature groups. Further, the processor 13 can detect positions of windows of each of the Q color temperature groups on the image IMG. The processor 13 can increase a second weighting of a color temperature group when a contiguous range or an overlapped range of windows of the color temperature group on the image IMG is increased. Conversely, the processor 13 can decrease the second weighting of the color temperature group when the contiguous range or the overlapped range of windows of the color temperature group on the image IMG is decreased. The second weighting is a non-negative number. For example, it is assumed that the first windows R1W1, R1W2, R1W3, R1W4, and R1W5 of the first region R1 are categorized into a certain color temperature group. Since the first windows R1W1, R1W2, R1W3, R1W4, and R1W5 include the contiguous range or the overlapped range, it implies that the first windows R1W1, R1W2, R1W3, R1W4, and R1W5 belong to the same object (i.e., a sky region). Therefore, the processor 13 can increase the second weighting of this color temperature group. In another embodiment, it is assumed that the second windows R2W1 and R2W4 of the second region R2 are categorized into another certain color temperature group. Since no contiguous range or overlapped range is introduced to the second windows R2W1 and R2W4, it implies that the second windows R2W1 and R2W4 of the second region R2 belong to different objects (i.e., a tree region and a grassland region). Therefore, the processor 13 can decrease the second weighting of another certain color temperature group. In other words, the processor 13 can set the second weighting of the at least one color temperature group according to the spatial information of the at least one color temperature group of the image IMG. A purpose is to detect if the windows in the at least one color temperature group correspond to the same object. If the windows of a certain color temperature group correspond to the same object, it implies that the windows have a monotonous color temperature. Therefore, the windows corresponding to the same object can be used for adjusting the white balance of the image IMG accurately.

In the auto white balance adjusting system 100, a frame by frame based white balance adjusting method can be introduced. For example, the processor 13 can continuously adjust the white balance of the image IMG frame by frame according to the color information of the N-M windows, the first weighting of the at least one color temperature group, and the second weighting of the at least one color temperature group. Further, the processor 13 can control the image capturing device 10 for updating the image IMG periodically for continuously adjusting the white balance of the image IMG frame by frame. As previously mentioned, since the referenced regions of the image IMG are optimized (i.e., filtering out extreme or chaotic color regions), the accuracy of adjusting the white balance of the image IMG can be greatly improved.

Figure 5:
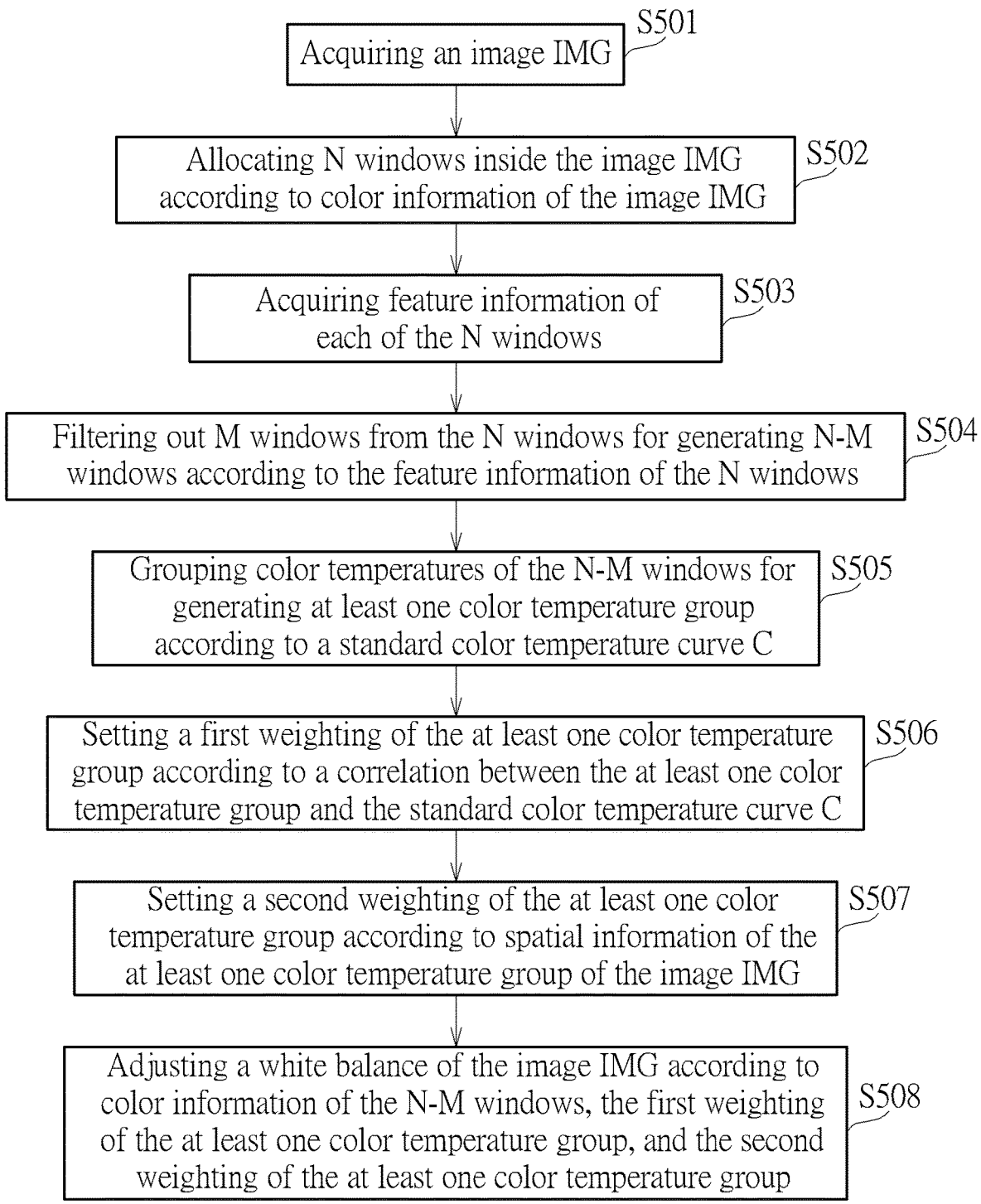
FIG. 5 is a flow chart of performing an auto white balance adjusting method by the auto white balance adjusting system in FIG. 1.

FIG. 5 is a flow chart of performing an auto white balance adjusting method by the auto white balance adjusting system 100. The auto white balance adjusting method includes step S501 to step S508. Any reasonable technology modification falls into the scope of the present invention. Step S501 to step S508 are illustrated below.

step S501: acquiring an image IMG;
step S502: allocating N windows inside the image IMG according to color information of the image IMG;
step S503: acquiring feature information of each of the N windows;
step S504: filtering out M windows from the N windows for generating N-M windows according to the feature information of the N windows;
step S505: grouping color temperatures of the N-M windows for generating at least one color temperature group according to a standard color temperature curve C;
step S506: setting a first weighting of the at least one color temperature group according to a correlation between the at least one color temperature group and the standard color temperature curve C;
step S507: setting a second weighting of the at least one color temperature group according to spatial information of the at least one color temperature group of the image IMG;
step S508: adjusting a white balance of the image IMG according to color information of the N-M windows, the first weighting of the at least one color temperature group, and the second weighting of the at least one color temperature group.

Details of step S501 to S508 are previously illustrated. Thus, they are omitted here. In the auto white balance adjusting system 100, by using step S501 to step S508, the referenced regions of the image IMG are optimized (i.e., filtering out extreme or chaotic color regions). Further, weightings of highly reliable regions are increased. As a result, the accuracy of adjusting the white balance of the image IMG can be greatly improved.

To sum up, the present invention discloses an auto white balance adjusting system. The auto white balance adjusting system introduces N windows for performing a blocked-based white balance adjusting mechanism. Therefore, computational complexity can be reduced. In order to avoid introducing extreme or chaotic colors, the auto white balance adjusting system can filter out M windows from the N windows for generating N-M windows according to the feature information of the N windows. Further, the auto white balance adjusting system introduces a window group mechanism and a weighting configuration mechanism. Further, the auto white balance adjusting system can adjust the weighting according to spatial information. Therefore, the accuracy of adjusting the white balance of the image by the auto white balance adjusting system can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto white balance adjusting method comprising:
acquiring an image;
allocating N windows inside the image according to color information of the image;
acquiring feature information of each of the N windows;
filtering out M windows from the N windows for generating N-M windows according to the feature information of the N windows;
grouping color temperatures of the N-M windows for generating at least one color temperature group according to a standard color temperature curve;
setting a first weighting of the at least one color temperature group according to a correlation between the at least one color temperature group and the standard color temperature curve;
setting a second weighting of the at least one color temperature group according to spatial information of the at least one color temperature group of the image; and
adjusting a white balance of the image according to color information of the N-M windows, the first weighting of the at least one color temperature group, and the second weighting of the at least one color temperature group;
wherein N and M are two positive integers, and N is greater than M.

2. The method of claim 1, wherein allocating the N windows inside the image according to the color information of the image comprises:
detecting a first color distribution of a first region of the image according to the color information of the image;
detecting a second color distribution of a second region of the image according to the color information of the image; and
increasing number of windows allocated in the first region when a variance of the first color distribution is greater than a variance of the second color distribution;
wherein a part of N windows are overlapped with one another, and sizes of the N windows are not exactly the same.

3. The method of claim 1, wherein acquiring the feature information of each of the N windows comprises acquiring a variance, a standard deviation, a horizontal gradient, and/or a vertical gradient of a plurality of pixels of each of the N windows.

4. The method of claim 1, wherein filtering out the M windows from the N windows for generating the N-M windows according to the feature information of the N windows comprises:
   setting a threshold;
   detecting a color shift characteristic of each of the N windows; and
   filtering out the M windows from the N windows when color shift characteristics of the M windows are greater than or equal to the threshold;
   wherein after the M windows from the N windows are filtered out, color shift characteristics of remaining N-M windows are smaller than the threshold.

5. The method of claim 1, wherein grouping the color temperatures of the N-M windows for generating the at least one color temperature group according to the standard color temperature curve comprises:
   acquiring a distance between the color temperatures of the N-M windows and the standard color temperature curve in a three-primary color domain; and
   grouping the color temperatures of the N-M windows into Q color temperature groups according to the distance between the color temperatures of the N-M windows and the standard color temperature curve in the three-primary color domain;
   wherein Q is a positive integer.

6. The method of claim 5, wherein setting the first weighting of the at least one color temperature group according to the correlation between the at least one color temperature group and the standard color temperature curve comprises:
   detecting number of color temperatures of each of the Q color temperature groups;
   increasing a first weighting of a color temperature group when number of color temperatures of the color temperature group is increased; and
   decreasing the first weighting of the color temperature group when the number of color temperatures of the color temperature group is decreased;
   wherein the first weighting is a non-negative number.

7. The method of claim 5, wherein setting the first weighting of the at least one color temperature group according to the correlation between the at least one color temperature curve and the standard color temperature curve comprises:
   detecting an average distance between color temperatures of each of the Q color temperature groups and the standard color temperature curve;
   decreasing a first weighting of a color temperature group when an average distance between color temperatures of the color temperature group and the standard color temperature curve is increased;
   increasing the first weighting of the color temperature group when the average distance between the color temperatures of the color temperature group and the standard color temperature curve is decreased;
   wherein the first weighting is a non-negative number, and when the first weighting is decreased to zero, the color temperature group is dropped.

8. The method of claim 5, wherein setting the second weighting of the at least one color temperature group according to the spatial information of the at least one color temperature group of the image comprises:
   detecting positions of windows of each of the Q color temperature groups on the image;
   increasing a second weighting of a color temperature group when a contiguous range or an overlapped range of windows of the color temperature group on the image is increased; and
   decreasing the second weighting of the color temperature group when the contiguous range or the overlapped range of windows of the color temperature group on the image is decreased;
   wherein the second weighting is a non-negative number.

9. The method of claim 1, wherein adjusting the white balance of the image according to the color information of the N-M windows, the first weighting of the at least one color temperature group, and the second weighting of the at least one color temperature group, is continuously adjusting the white balance of the image frame by frame according to the color information of the N-M windows, the first weighting of the at least one color temperature group, and the second weighting of the at least one color temperature group.

10. The method of claim 1, further comprising updating the image periodically by using an image capturing device for continuously adjusting the white balance of the image frame by frame.

11. An auto white balance adjusting system comprising:
   an image capturing device configured to acquire an image;
   a memory configured to save data;
   an output device configured to output an adjusted image; and
   a processor coupled to the image capturing device, the memory, and the output device and configured to control the image capturing device, the memory, and the output device;
   wherein after the image capturing device acquires an image, the processor allocates N windows inside the image according to color information of the image, the processor acquires feature information of each of the N windows, the processor filters out M windows from the N windows for generating N-M windows according to the feature information of the N windows, the processor groups color temperatures of the N-M windows for generating at least one color temperature group according to a standard color temperature curve saved in the memory, the processor sets a first weighting of the at least one color temperature group according to a correlation between the at least one color temperature group and the standard color temperature curve, the processor sets a second weighting of the at least one color temperature group according to spatial information of the at least one color temperature group of the image, the processor adjusts a white balance of the image according to color information of the N-M windows, the first weighting of the at least one color temperature group, and the second weighting of the at least one color temperature group, the processor controls the output device for outputting the adjusted image, N and M are two positive integers, and N is greater than M.

12. The system of claim 11, wherein the processor detects a first color distribution of a first region of the image according to the color information of the image, the processor detects a second color distribution of a second region of the image according to the color information of the image, the processor increases number of windows allocated in the first region when a variance of the first color distribution is greater than a variance of the second color distribution, a part of N windows are overlapped with one another, and sizes of the N windows are not exactly the same.

13. The system of claim 11, wherein the feature information of each of the N windows comprises a variance, a standard deviation, a horizontal gradient, and/or a vertical gradient of a plurality of pixels of each of the N windows.

14. The system of claim 11, wherein the processor setting a threshold, the processor detects a color shift characteristic of each of the N windows, the processor filters out the M windows from the N windows when color shift characteristics of the M windows are greater than or equal to the threshold, and after the M windows from the N windows are filtered out, color shift characteristics of remaining N-M windows are smaller than the threshold.

15. The system of claim 11, wherein the processor acquires a distance between the color temperatures of the N-M windows and the standard color temperature curve in a three-primary color domain, the processor groups the color temperatures of the N-M windows into Q color temperature groups according to the distance between the color temperatures of the N-M windows and the standard color temperature curve in the three-primary color domain, and Q is a positive integer.

16. The system of claim 15, wherein the processor detects number of color temperatures of each of the Q color temperature groups, the processor increases a first weighting of a color temperature group when number of color temperatures of the color temperature group is increased, the processor decreases the first weighting of the color temperature group when the number of color temperatures of the color temperature group is decreased, and the first weighting is a non-negative number.

17. The system of claim 15, wherein the processor detects an average distance between color temperatures of each of the Q color temperature groups and the standard color temperature curve, the processor decreases a first weighting of a color temperature group when an average distance between color temperatures of the color temperature group and the standard color temperature curve is increased, the processor increases the first weighting of the color temperature group when the average distance between the color temperatures of the color temperature group and the standard color temperature curve is decreased, the first weighting is a non-negative number, and when the first weighting is decreased to zero, the color temperature group is dropped.

18. The system of claim 15, wherein the processor detects positions of windows of each of the Q color temperature groups on the image, the processor increases a second weighting of a color temperature group when a contiguous range or an overlapped range of windows of the color temperature group on the image is increased, the processor decreases the second weighting of the color temperature group when the contiguous range or the overlapped range of windows of the color temperature group on the image is decreased, and the second weighting is a non-negative number.

19. The system of claim 11, wherein the processor continuously adjusts the white balance of the image frame by frame according to the color information of the N-M windows, the first weighting of the at least one color temperature group, and the second weighting of the at least one color temperature group.

20. The system of claim 11, wherein the processor controls the image capturing device to update the image periodically for continuously adjusting the white balance of the image frame by frame.

* * * * *